Sept. 2, 1969　　　T. HORSKY, JR　　　3,464,529
FRUIT HANDLING DEVICE
Filed March 4, 1968　　　　　　　2 Sheets-Sheet 2
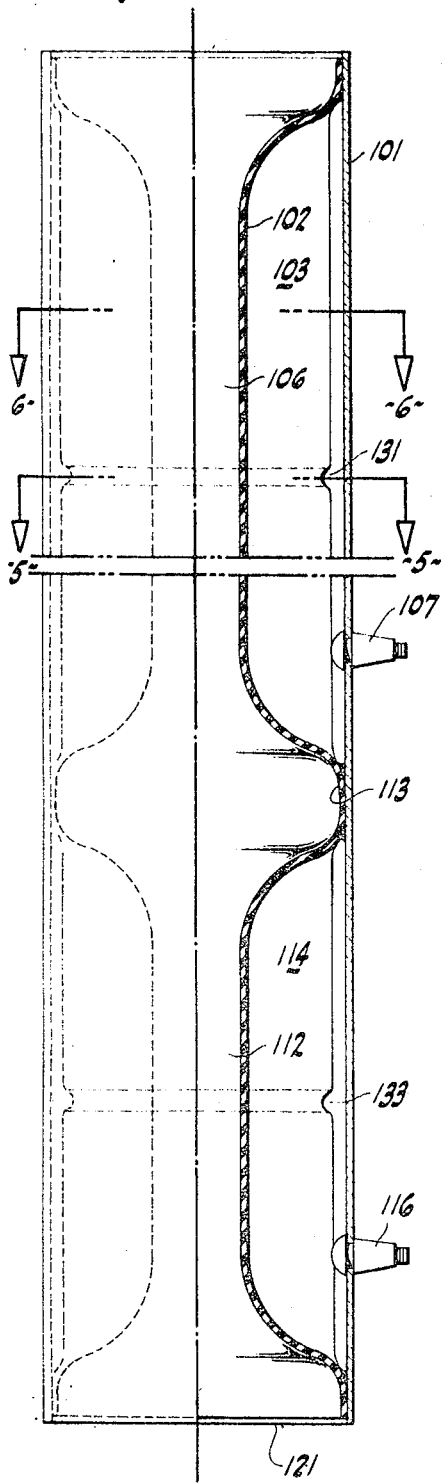
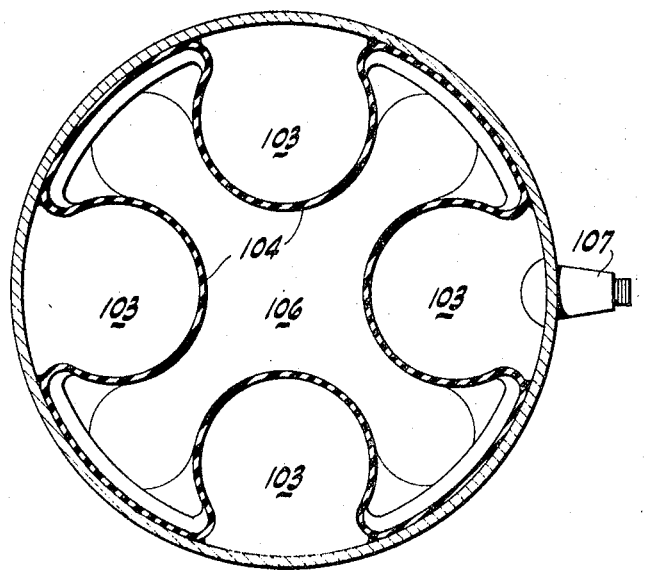
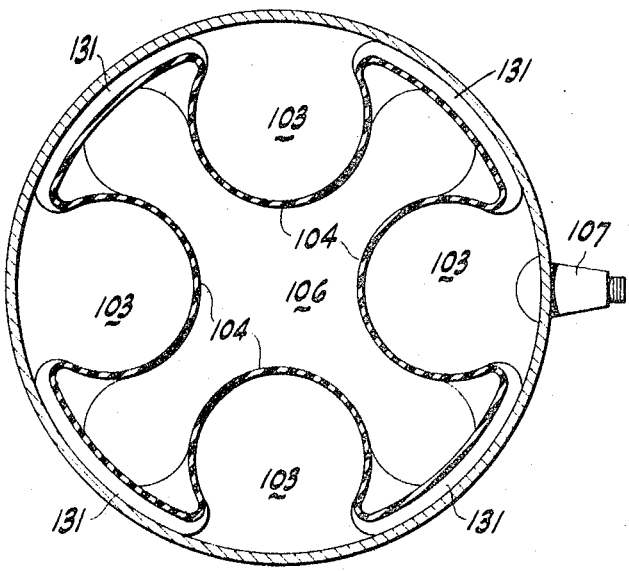
INVENTOR
THEODORE HORSKY, JR.
BY
Lothrop & West
ATTORNEYS

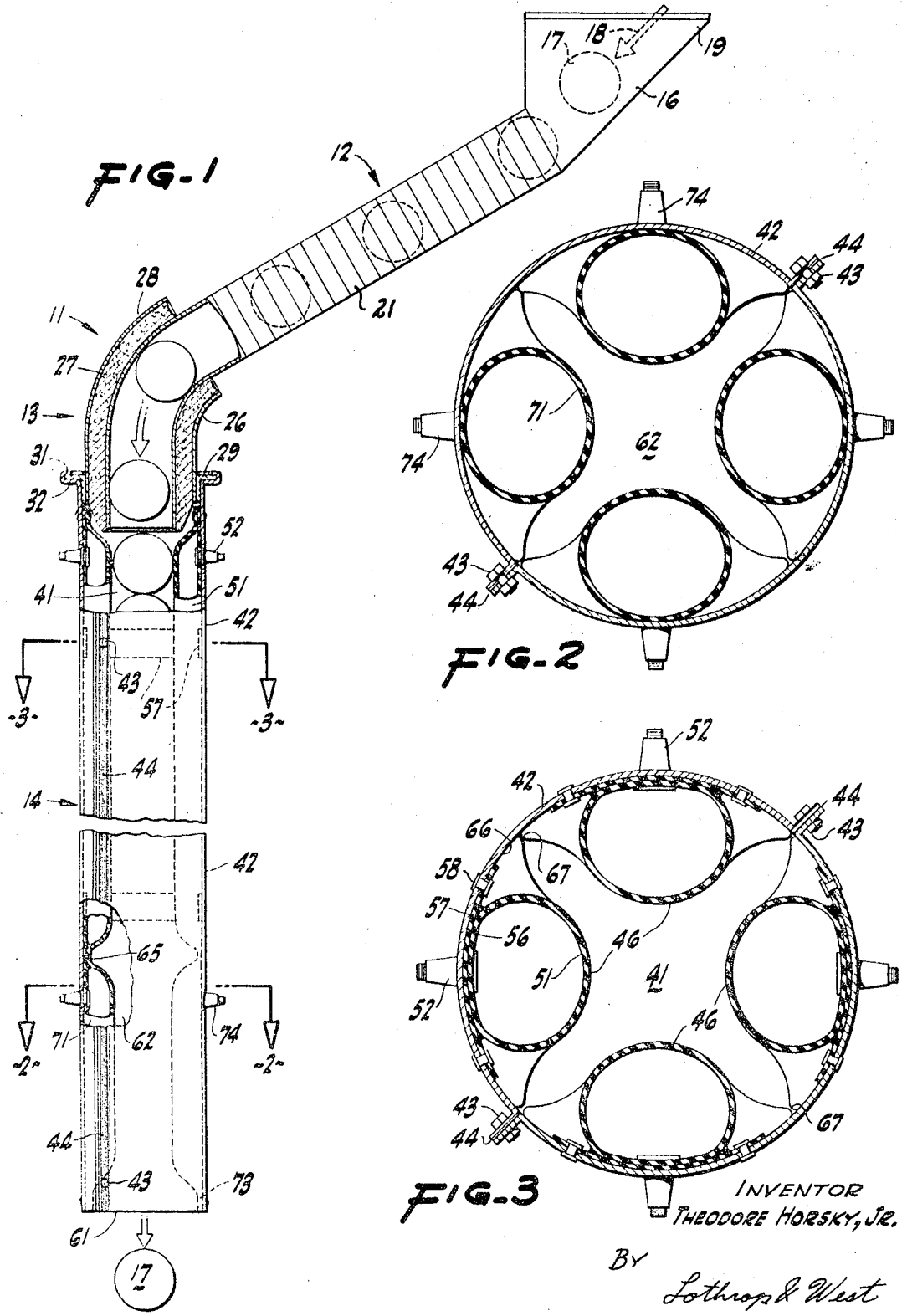

United States Patent Office 3,464,529
Patented Sept. 2, 1969

3,464,529
FRUIT HANDLING DEVICE
Theodore Horsky, Jr., Rte. 1, Box 44,
Walnut Grove, Calif. 59690
Filed Mar. 4, 1968, Ser. No. 710,318
Int. Cl. B65g 11/20, 11/00
U.S. Cl. 193—7                    4 Claims

ABSTRACT OF THE DISCLOSURE

Pivotally mounted on the upper end of a substantially vertical conduit is an elbow connected to a hose terminating in a fruit receiving hopper. Fruits which are especially subject to handling damage, such as peaches and pears, are picked from the tree and placed in the hopper from which location they roll down the hose and pass through the elbow and the conduit to discharge at the lower end into a suitable receptacle or conveyor. Resilient cushions arranged on the inner walls of the conduit frictionally interfere with the fruit falling therethrough, the extent of interference being such as to decelerate the fruit so that the discharge velocity is sufficiently small as substantially to eliminate fruit damage.

---

The invention relates generally to improvements in devices for handling fragile and easily damaged objects, such as many kinds of freshly picked fruits and vegetables, and, more particularly, to substantially vertical ducts arranged to carry easily damaged fruit from the tree to a container located at a lower elevation.

Fruits such as pears, peaches, apricots and others of a similar delicate nature require extreme care in handling at the time of picking in order to avoid bruises and other damage which downgrade or even require the fruit to be discarded. This has necessitated in years past that the picker carry around a relatively small bag into which the picked fruit is rather carefully deposited. As the bag becomes full, the picker proceeds to a nearby box, bin, or other receptacle into which the fruit is transferred from the bag. This procedure is not only time-consuming but is also wearisome for the picker, particularly when the tree is large enough to require the use of ladders to reach the fruit higher in the tree than can be reached by standing on the ground.

Recent labor-saving developments in the field of agricultural implements include the use of elevated platforms on frames capable of moving alongside a row of trees. The platforms are ordinarily carried on structures supported by ground-engaging wheels and are customarily either of the swingable boom or of the tower variety. The platform supports one or more pickers who can readily pluck the fruit even from elevated locations on the tree.

For greatest efficiency and least effort to the picker, the picker should only be required to pick the fruit, move the hand carrying the fruit a short distance and drop the fruit, thereby freeing his hand to reach for the next fruit to be picked.

Once the picked fruit is dropped, it must be transported to a suitable receptacle, such as a bin, located below the platform. Where the platform is quite elevated, the vertical distance through which the fruit must fall is substantial, as much perhaps as ten to twelve feet, or even more. A free fall of this magnitude would be most damaging to the fruit.

It is therefore an object of the invention to provide a fruit handling device which safely carries fruit from a higher to a lower elevation.

It is another object of the invention to provide a fruit handling device which minimizes the time and effort expended by the fruit picker.

It is still another object of the invention to provide a fruit handling device which is relatively economical to make and install, and which is rugged and durable in operation.

It is a further object of the invention to provide a device which is relatively light in weight and compact in size yet which is capable of safely handling a large quantity of product.

It is yet a further object of the invention to provide a generally improved fruit handling device.

Other objects, together with the foregoing, are attained in the embodiments described in the following description and shown in the accompanying drawings in which:

FIGURE 1 is a fragmentary, side elevational view of one form of device, portions being shown in section;

FIGURE 2 is a transverse sectional view, to an enlarged scale, the plane of the section being indicated by the line 2—2 in FIGURE 1;

FIGURE 3 is a transverse sectional view, to an enlarged scale, the plane of the section being indicated by the line 3—3 in FIGURE 1;

FIGURE 4 is a fragmentary side elevational view of a modified form of device, portions being shown in section;

FIGURE 5 is a transverse sectional view, to an enlarged scale, the plane of the section being indicated by the line 5—5 in FIGURE 4; and, FIGURE 6 is a transverse sectional view, to an enlarged scale, the plane of the section being indicated by the line 6—6 in FIGURE 4.

While the fruit handling device of the invention is susceptible of numerous physical embodiments, depending upon the environment and requirements of use, substantial numbers of the herein shown and described embodiments have been made, tested and used, and all have performed in an eminently satisfactory manner.

The fruit handling device of the invention, generally designated by the reference numeral 11 preferably comprises three major components, a fruit collecting member 12, a pivoting elbow member 13 and a fruit guiding and decelerating member 14.

The device is mounted in any appropriate manner on a mobile frame or chassis movable down a row of trees being picked. Fruit pickers are carried by suitably elevated and positioned platforms on the frame. The attendant frame and platform structures form no part of the present invention, as such, and are therefore neither shown nor described in detail.

Adjacent the upper end of the collecting member 12 there is conveniently provided a hopper 16 opening upwardly to receive a fruit 17 dropped by a picker's hand in the direction indicated by the arrow 18. In some situations, the picker might like to stand facing toward the hopper 16 with the acute angle portion 19 of the hopper engaging the chest at about breast height. In this case, a pair of suitable shoulder straps (not shown) could be mounted on the hopper and worn by the picker, in which event both arms of the picker could be concurrently used to reach out, pluck the fruit and bend the elbows so as to drop the fruit into the open hopper.

From the bottom of the hopper 16, the fruit rolls down a hose 21 which can be of any suitable material, such as canvas.

Encompassing the lower end of the hose 21 is an elbow-shaped collar 26 of highly resilient material, such as foam rubber 27 surrounded by a sheathing 28.

The soft material of the elbow 26 serves to deflect the fruit downwardly with a maximum of safety. It is also to be noted that this deflection takes place with equal facility regardless of the orientation of the hose 21. That is to say, the lower end of the elbow 26 carries a horizontal, annular flange member 29 slidably disposed within a trackway defined by a pair of spaced, parallel flanges 31 and 32 carried on the uppermost end of the fruit decelerating member 14. In other words, as the orientation of the inclined hose 21 is varied, the collar 26 swings about a vertical axis in dependence thereon so that the fruit falling down through the hose 21 smoothly enters the elbow portion of the collar and is gently deflected downwardly into a vertical path, as shown in FIGURE 1.

Upon emerging from the elbow, the fruit enters the upper end of a vertical axial passageway 41 disposed within the fruit decelerating member 14.

The decelerating member 14 preferably comprises a right, circular cylindrical conduit 42 formed of metal and including two halves joined together by suitable fastenings 43 along mating flanges 44 carried on diametrically located, vertical longitudinal elements of the conduit.

Inside the conduit 42, decelerating elements 46 are arranged to project inwardly into resilient, frictionally interfering relation with the fruit descending through the central passageway 41.

The extent of interference and resilience, and the coefficient of friction are taken into account so that while a substantial, continuous flow of fruit is attained, the free fall velocity is sufficiently impeded so that it does not reach fruit damaging proportions. These factors are adjusted in dependence upon the kind and degree of ripeness of the fruit and are ascertained by noting the results of handling several of the fruit.

While the decelerating elements 46 could be of soft, resilient material, such as foam rubber, and while they could be in the nature of inwardly projecting resilient fingers, I prefer to utilize a plurality of pneumatically inflated bladders 51 of a vertically elongated configuration to afford control over the amount of constriction. In the forms of devices shown herein, the central passageways are defined by four such bladders.

Each bladder, of an elastomeric material, is individually inflatable and deflatable through suitable air valves 52 protruding exteriorly from the conduit 42 for ease of operation, the extent of inflation affording one important measure of control over the extent of the constriction, and thus the rate of fall.

The precise manner of construction of the bladders, as well as their configuration, arrangement and means of anchoring is susceptible of being varied.

In the form of device shown in FIGURES 1 through 3, I have shaped each of the elongated bladders so that throughout the majority of its length it is in transverse section somewhat elliptical and flattened along the side adjacent the conduit walls (see FIGURE 3). Vulcanized to the flattened wall portion 56 adjacent the upper and lower ends of the bladders is an arcuate anchor strip 57 secured to the conduit walls, as by rivets 58.

In order to reduce the speed of the fruit to an especially small velocity as it approaches the lower, discharge end 61 of the conduit, the decelerating members 46 are so shaped and so dimensioned (see FIGURE 2) that the central passageway 62 for the last one to two feet of fall is more constricted than the passageway 41 of the previous, upper eight to ten feet.

In other words, I flatten out and vulcanize the ends of the upper four bladders 51 against the retainer, or anchor strips 57 and against the encompassing inner walls 66 of the conduit so that the adjacent bladder walls substantially abut, as at 67.

In comparable fashion, I flatten out and secure, as at 65, the upper ends of a lower set of bladders 71, shorter in vertical extent than the upper bladders 51. The lower bladders 71 are each somewhat more circular and each somewhat greater in "diameter" than the upper bladders, thus making the lower passageway 62 more constricted than the upper passageway 41 (see FIGURE 2). Thus, in traversing the lower passageway 62, the fruit 17 is brought substantially to a halt at the moment it emerges from the lower end 61 of the conduit and falls into a subjacent receptacle or conveyor (not shown) for storage or removal.

As appears in broken line in FIGURE 1, the lower ends of the lower bladders 71 are sealed off, as at 73, and each of the lower bladders is provided with an individual air valve 74.

The FIGURES 4 through 6 form of device is a modification and differs from the FIGURES 1 through 3 form in the construction of the decelerating member.

A conduit 101 has arranged therein an elastomeric diaphragm 102 molded to form a plurality of convolutions defining a plurality of substantially circular-in-section chambers 103, the chamber walls 104 centrally defining, in turn, a vertical, axial passageway 106 for the downward movement of fruit passing therethrough.

An air valve 107 affords control over the chamber pressures and thus the degree of constriction provided by the boundary walls 104. The greater the pressure, the greater the constriction and thus the more retarded the speed of the fruit.

As before, the lower passageway 112, extending for the last foot or so of length, is more constricted than the upper passageway 106. In order to achieve this result, the upper chambers 103 are terminate at their lower end in a sealing configuration 113, and below the peripheral seal 113, a lower set of four chambers 114 is provided, with an attendant air valve 116. By suitably proportioning the convolutions, and adjusting the air pressure the lower passageway 112 can be made sufficiently constrictive so that the fruit emergent from the lower end 121 can, as before, be moving at a suitably slow velocity.

The molded diaphragm shown in FIGURES 4 through 6 especially lends itself to the economies of large scale production. Each of the upper chambers 103 is interconnected by an annular passageway 131 (see FIGURE 5); in like manner the lower chambers 114 are connected by the passageway 133. The individual air valves 107 and 116, in other words, are capable of regulating the air pressure in all of the respective chambers 103 and 114. A nice degree of control over velocity of fall is thereby provided.

It can therefore be seen that I have provided a fruit handling device which enables fruit to be picked directly from the tree and transported to storage in an expeditious and safe manner with but a minimum of damage.

What is claimed is:
1. A fruit handling device comprising:
   (a) a fruit collecting member arranged to receive fruit located on a tree at an elevated position;
   (b) a substantially vertical fruit decelerating member extending from an upper end downwardly to a lower end capable of discharging fruit passing downwardly through said decelerating member, said decelerating member including a conduit exceeding in transverse dimension the size of the fruit passing therethrough, and a plurality of vertically elongated, pneumatically inflated bladders arranged around the inner walls of said conduit to afford an axial, substantially vertical passageway, the dimensions of said bladders defining said passageway being such that said bladders substantially impede the free fall of the fruit dropping through said passageway, and the portion of said passageway adjacent said lower dis- charge end is constricted to a greater extent than the portion of said passageway adjacent said upper end; and, (c) a fruit guiding member connected at its upper end to said fruit collecting member and at its lower end to said fruit decelerating member, said fruit guiding member being freely capable of three-dimensional movement enabling said fruit collecting member to be selectively moved to locations laterally removed from the substantially vertical axis of said fruit decelerating member.

2. A fruit handling device as in claim 1 wherein said fruit guiding member includes a flexible hose having resilient inner wall surfaces.

3. A fruit handling device as in claim 2 further including an elbow-shaped collar of cushioning material interposed between said fruit guiding member and said fruit decelerating member, the lower portion of said collar being pivotally mounted on the upper end of said fruit accelerating member to orient said collar in dependence upon the orientation of said hose connected thereto.

4. A fruit handling device as in claim 2 wherein said fruit collecting member includes a hopper mounted on the upper end of said fruit collecting member.

References Cited

UNITED STATES PATENTS

| 2,647,670 | 8/1953 | Cox | 193—7 |
| 2,702,209 | 2/1955 | Vames | 193—7 |
| 3,115,960 | 12/1963 | Ott | 193—7 |

FOREIGN PATENTS

| 1,052,898 | 3/1959 | Germany. |
| 1,066,492 | 10/1959 | Germany. |

ANDRES H. NIELSEN, Primary Examiner

U.S. Cl. X.R.

193—32